Patented Aug. 26, 1924.

1,505,993

UNITED STATES PATENT OFFICE.

EDGAR A. BARKALOW, OF KOKOMO, INDIANA, ASSIGNOR OF ONE-HALF TO ORRIS J. HOLLOWELL, OF KOKOMO, INDIANA.

ELECTROLYTE FOR STORAGE BATTERIES.

No Drawing. Application filed April 21, 1923. Serial No. 633,785.

*To all whom it may concern:*

Be it known that I, EDGAR A. BARKALOW, a citizen of the United States, residing at Kokomo, in the county of Howard and State of Indiana, have invented new and useful Improvements in Electrolytes for Storage Batteries, of which the following is a specification.

This invention relates to an electrolyte for storage batteries and the prime feature of the invention is the provision of an electrolyte which will replace the ordinary electrolyte formed from sulphuric acid and water.

A further feature of the invention is in so constructing the electrolyte that it will have a viscid or creamy consistency to such an extent that it will not tend to spill from the battery while the battery is in use.

A further feature of the invention is the provision of an electrolyte having moisture retaining qualities which eliminates the necessity of frequent renewals of the water content of the battery and lowers the point at which the electrolyte will freeze to a very low degree.

The electrolyte is composed of the following ingredients and substantially in the following proportions:

Sulphuric acid 400 cubic centimeters of 1.40 specific gravity.

Corn starch 3.2 grammes.

Calcined calcium sulphate 320 grammes.

Formaldehyde 72 cubic centimeters of 40% solution.

Water 200 cubic centimeters.

The composition is prepared and commingled in the following manner:

To 400 cubic centimeters of sulphuric acid of 1.40 specific gravity add 3.2 grammes of corn starch, permitting the same to stand for not less than twenty-four (24) hours.

To this mixture is then added 320 grammes of calcined calcium sulphate and this mixture permitted to stand for not less than forty eight (48) hours. This mixture is then introduced into the ordinary storage battery in any suitable manner and after being so introduced, 72 cubic centimeters of 40% solution of formaldehyde and 200 cubic centimeters of water is introduced into the battery.

The addition of the corn starch to the sulphuric acid prevents the re-crystallization of the calcium sulphate and produces a smooth creamy highly viscous mass of a hygroscopic nature and one that will withstand a very low degree of temperature before freezing. The electrolyte thus produced will exert a low resistance to the electric current, thus increasing the life and efficiency of the battery.

The addition of the formaldehyde, due to its effervescent qualities will aid in distributing the electrolyte throughout the elements of the storage battery, thereby rendering all parts of the battery uniform in strength.

It will thus be seen that I have provided an electrolyte which, due to its hygroscopic nature will require but a minimum amount of water at rare intervals to maintain the proper moisture and due to the viscous or semifluid nature, will not tend to spill from the battery incident to usage.

It will likewise be seen that the electrolyte will be practically indestructible from use and with very minor attentions will last substantially the life of the elements of the battery.

What I claim is:

1. An electrolyte composed of sulphuric acid, calcium sulphate and a substance for producing a viscous hygroscopic mass.

2. An electrolyte comprising a sulphuric acid, calcium sulphate and starch for forming a viscous hygroscopic mass.

3. An electrolyte comprising sulphuric acid, corn starch, calcium sulphate, formaldehyde and water.

4. An electrolyte comprising sulphuric acid, corn starch, calcium sulphate, formaldehyde and water in the proportions and commingled as specified.

In testimony whereof I hereto affix my signature.

EDGAR A. BARKALOW.